(12) United States Patent
Pedersen et al.

(10) Patent No.: US 7,711,732 B2
(45) Date of Patent: May 4, 2010

(54) DETERMINING RELATED TERMS BASED ON LINK ANNOTATIONS OF DOCUMENTS BELONGING TO SEARCH RESULT SETS

(75) Inventors: Jan Pedersen, Los Altos Hills, CA (US); Hadar Shemtov, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 325 days.

(21) Appl. No.: 11/408,550

(22) Filed: Apr. 21, 2006

(65) Prior Publication Data

US 2007/0250498 A1 Oct. 25, 2007

(51) Int. Cl.
*G06F 7/00* (2006.01)
*G06F 17/30* (2006.01)

(52) U.S. Cl. ............... 707/726; 707/765; 707/E17.014

(58) Field of Classification Search ............ 707/5, 707/999.005, 726, 765, E17.014
See application file for complete search history.

(56) References Cited

U.S. PATENT DOCUMENTS

| 5,842,206 | A | * | 11/1998 | Sotomayor | 707/5 |
| 5,920,859 | A | * | 7/1999 | Li | 707/5 |
| 6,006,225 | A | * | 12/1999 | Bowman et al. | 707/5 |
| 6,112,203 | A | * | 8/2000 | Bharat et al. | 707/5 |
| 6,122,647 | A | * | 9/2000 | Horowitz et al. | 715/205 |
| 6,732,088 | B1 | * | 5/2004 | Glance | 707/3 |
| 6,941,297 | B2 | * | 9/2005 | Carmel et al. | 707/3 |
| 7,146,358 | B1 | * | 12/2006 | Gravano et al. | 707/4 |
| 7,158,966 | B2 | * | 1/2007 | Brill et al. | 707/3 |
| 7,260,573 | B1 | * | 8/2007 | Jeh et al. | 707/7 |
| 2003/0055810 | A1 | * | 3/2003 | Cragun et al. | 707/1 |
| 2005/0210006 | A1 | * | 9/2005 | Robertson et al. | 707/3 |
| 2006/0074871 | A1 | * | 4/2006 | Meyerzon et al. | 707/3 |
| 2006/0085391 | A1 | * | 4/2006 | Turski et al. | 707/3 |
| 2007/0112759 | A1 | * | 5/2007 | Kulakow et al. | 707/5 |
| 2007/0185858 | A1 | * | 8/2007 | Lu et al. | 707/5 |
| 2010/0030735 | A1 | * | 2/2010 | Curtis et al. | 707/3 |

OTHER PUBLICATIONS

Reiner Kraft et al, "Mining Anchor Text for Query Refinement", May 2004.*

* cited by examiner

*Primary Examiner*—Mohammad Ali
*Assistant Examiner*—Brannon W Smith
(74) *Attorney, Agent, or Firm*—Hickman Palermo Truong & Becker LLP; Christian A. Nicholes

(57) ABSTRACT

Techniques for automatically focusing searches conducted by a search engine are provided. According to one aspect, revised query terms are automatically generated based on text in links that are in incoming (and/or outgoing) link lists associated with documents that are referenced in initial search results generated based on initial query terms. For example, some of the phrases that appear in incoming (and/or outgoing) links associated with a result document may be selected. The selected phrases may be added to the initial query terms to generate revised query terms. These revised query terms may be submitted automatically to the search engine in order to produce a more focused list of revised search results. This process may be performed repeatedly, each iteration revising query terms generated by the previous iteration, until specified criteria are satisfied, at which point the final revised search results may be presented to a user.

20 Claims, 2 Drawing Sheets

DETERMINING RELATED TERMS BASED ON LINK ANNOTATIONS OF DOCUMENTS BELONGING TO SEARCH RESULT SETS

FIELD OF THE INVENTION

The present invention relates to search engines and, more specifically, to a technique for automatically focusing and narrowing search results.

BACKGROUND

Search engines that enable computer users to obtain references to web pages that contain one or more specified words are now commonplace. Typically, a user can access a search engine by directing a web browser to a search engine "portal" web page. The portal page usually contains a text entry field and, sometimes, a button control. The user can initiate a search for web pages that contain specified query terms by typing those query terms into the text entry field. When the button control is activated, or when a script executing on the "portal" web page determines that a specified event has been occurred, the query terms are sent to the search engine, which typically returns, to the user's web browser, a dynamically generated web page that contains a list of references to other web pages that contain the query terms.

All too often, such a list of references includes references to web pages that have little or nothing to do with the subject matter in which the user is interested. Even if the referenced web pages contain the query terms that the user has submitted to the search engine, this is no guarantee that those web pages will be focused on the topic to which the query terms pertain; the occurrence of the query terms in a web page may be merely tangential to the web page's primary discussion. As a result, the user is forced to hunt and pick through multitudes of irrelevant search results in order to find a select few web pages in which the user is actually interested.

What is needed is an automated way of focusing a search so that the web pages referenced in the list of search results therein have a higher probability of relevance to the subject matter in which the user is interested.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
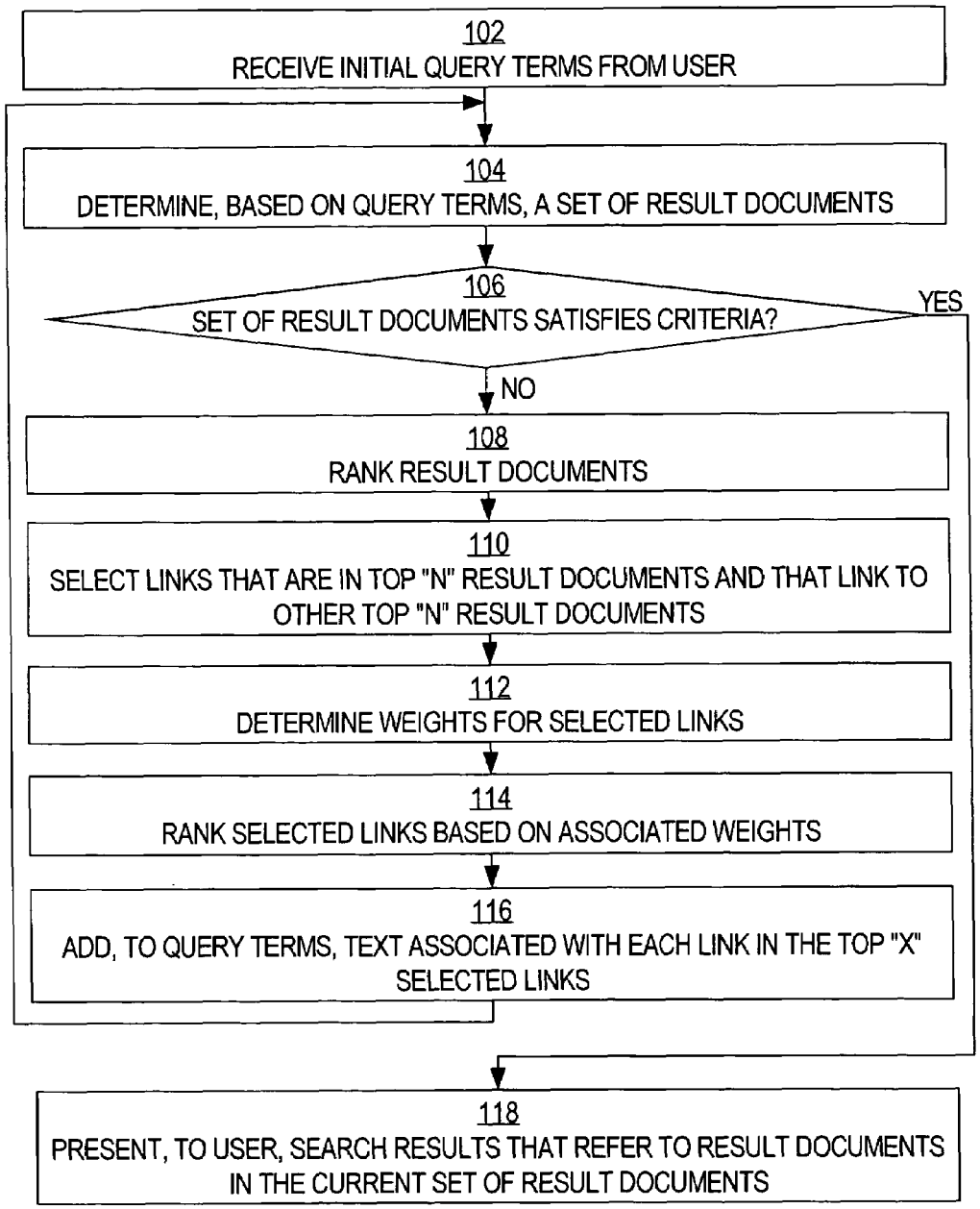
FIG. 1 is a flow diagram that illustrates an example of a technique for automatically generating revised query terms based on link-related text, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Automated mechanisms are provided through which searches conducted by a search engine, such as the Internet search engine provided by Yahoo!, are focused and narrowed. The automated mechanisms accomplish this narrowing and focusing based on link-associated data, such as the text that typically appears underlined in a hyperlink on a web page. Such text is typically referred to as "anchor text." As a result of the narrowing, the search engine returns search results that are typically more relevant to the interests of the user who submitted initial query terms to the search engine.

According to one embodiment of the invention, a separate list of incoming and outgoing links is maintained, in an index, for each document (e.g., web page) in a set of documents. The list of incoming links associated with a particular document indicates other documents that contain links that reference the particular document. The list of outgoing links associated with a particular document indicates other documents that are referenced by links in the particular document. For example, assuming that web pages "A," "B," and "C" each contain links that refer to web page "D," the list of incoming links associated with web page "D" comprises those of the links in web pages "A," "B," and "C" that refer to web page "D." Similarly, assuming that web page "D" contains links that refer to web pages "E," "F," and "G," the list of outgoing links associated with web page "D" comprises those of the links in web page "D" that refer to web pages "E," "F" and "G."

A search engine generates initial search results based at least in part on initial query terms that a user submits to the search engine. The initial search results refer to result documents. In one embodiment of the invention, revised query terms are automatically generated. The revised query terms are generated based at least in part on anchor text within links that are in the incoming (and/or outgoing) lists associated with the result documents. The specific manner in which the anchor text is used to generate the revised query terms is discussed in greater detail below.

For example, for each phrase that appears in an incoming (or, in some embodiments of the invention, outgoing) link associated with a result document, a separate weight may be determined. Some of the phrases may be selected based on their associated weights. The selected phrases may be added to the initial query terms in order to generate revised query terms. These revised query terms may be submitted automatically to the search engine in order to produce a narrowed and more focused list of revised search results. This process may be performed repeatedly, each iteration revising query terms generated by the previous iteration, until specified criteria are satisfied, at which point the final revised search results may be presented to a user that submitted the initial query terms.

In one embodiment of the invention, instead of presenting revised search results to a user, the initial search results produced based on the initial query terms are presented to the user. However, along with these initial search results, one or more suggested sets of revised query terms are also presented. These suggested sets of revised query terms are automatically generated in the manner described above. A user may select a set of revised query terms in order to see the revised search results that are produced when the revised query terms in the selected set are submitted to the search engine.

Example Flow

According to one embodiment of the invention, revised query terms are generated at least in part by (a) determining the top "N" result documents returned by a search based on initial query terms, (b) selecting, within the top "N" result documents, links that refer to other documents in the top "N" result documents, and (c) adding, to the initial query terms, at least some words or phrases that appear in the selected links.

FIG. 1 is a flow diagram that illustrates an example of a technique for automatically generating revised query terms based on link-related text, according to an embodiment of the invention. The technique described is merely one embodiment of the invention. Some other alternative embodiments of the invention are described further below. The technique, or portions thereof, may be performed, for example, by one or more processes executing on a computer system such as that described below with reference to FIG. 2. For example, the technique may be performed by one or more processes executing on a server on which a search engine resides.

In block 102, one or more initial query terms are received. For example, a search engine may receive the initial query terms via the Internet through a browser-based user interface that was sent to a user's Internet browser. Mozilla Firefox is an example of such an Internet browser. Typically, the initial query terms will be one or more words that the user typed into a field within the user interface.

In block 104, a set of result documents is determined based on query terms. If this is the first iteration through block 104, then the query terms are the initial query terms received in block 102, and the result documents are called initial result documents. Otherwise, the query terms are the revised query terms determined in block 116 below, and the result documents are called revised result documents. Typically, the search engine selects the result documents from a "search corpus" which comprises previously and automatically discovered web pages that have been indexed in a database. Usually, the search engine selects the result documents based on relevance, where relevance is based at least in part on how many of the query terms appear in the result documents, and how frequently those query terms appear in the result documents. Relevance may be based on other factors as well.

In block 106, it is determined whether the set of result documents satisfies specified criteria. For example, the search engine may determine whether the most recently determined set of result documents is within a specified degree of similarity to the second most recently determined set of result documents. If the most recently determined set of result documents is within the specified degree of similarity to the second most recently determined set of result documents (e.g., at least a specified percentage of the result documents occur in both sets), then control passes to block 118. Otherwise, control passes to block 108.

In block 108, the result documents are ranked. Typically, the search engine ranks the result documents based on a relevance score assigned to each result document. Result documents with higher relevance scores are usually ranked higher than result documents within lower relevance scores. Ranking the result documents places the result documents in an order relative to each other.

In block 110, for each result document in the top "N" result documents (where "N" is a specified number), links that refer to other result documents in the top "N" result documents are selected. A list of outgoing links associated with each top "N" result document, as discussed above, may be used in the link selection process. For example, if a top "N" result document "A" contains both a link to top "N" result document "B" and a link to top "N" result document "C," then the search engine selects each of those links. Similarly, if top "N" result document "B" contains a link to top "N" result document "A," then the search engine selects that link also. Thus, a group of selected links is generated. These selected links are used as described below.

In block 112, a separate weight is determined for each of the links in the group of selected links. For example, the search engine may determine a weight for a link based at least in part on whether that link occurs within a title or header of a result document. Links that occur within a title or header of a result document may be weighted more heavily than links that don't. For another example, the search engine may determine a weight for a link based at least in part on whether the text within that link is in bold, italicized, or otherwise emphasized or strong font. Links that are so emphasized may be weighted more heavily than links that are not. For yet another example, the search engine may determine a weight for a link based at least in part on whether the anchor text in that link corresponds to the subject of, or otherwise identifies the topic of, the sentence in which that link occurs. Links in which the anchor text corresponds to a subject or topic of a sentence may be weighted more heavily than links in which the text does not correspond to a subject or topic of a sentence. The weights associated with the links are used as described below.

In block 114, the selected links are ranked based on their associated weights. For example, the search engine may rank the selected links in such a way that the links with heavier weights are ranked higher than links with lighter weights. Ranking the selected links places the selected links in an order relative to each other.

According to a first embodiment of the invention, in block 116, for each selected link in the top "X" selected links (where "X" is a specified number), text that is associated with that top "X" selected link is added to the existing query terms to form revised query terms. According to a second, alternative embodiment of the invention, such text is simply displayed to the user as one or more suggested query terms. Referring again to the first embodiment of the invention, if this is the first iteration, then the existing query terms are the initial query terms. For example, the text added to the existing query terms may be anchor text that would be displayed by a browser as the underlined words that indicate the presence of the link in the document in which the link is contained. For another example, the text added to the existing query terms might be metadata that is associated with the link, even if that metadata is in the code of a web page and not normally displayed to a user. The text added to the existing query terms may comprise a phrase of one or more words, for example. Control then passes back to block 104, in which a revised search is performed based on the revised query terms. Prior to this, however, the set of current result documents may be stored for comparison with a later-generated set of result documents—as is described in block 106 above, for example.

Alternatively, in block 118, search results that refer to result documents in the current set of result documents are presented to the user from which the initial query terms were received in block 102. For example, the search engine may dynamically generate a web page that lists references to at least some of the result documents in the set most recently determined in block 104, and then send that web page via the Internet toward the user's Internet browser.

As is discussed above, the foregoing technique is but one of many possible variant embodiments of the invention. Some alternative embodiments of the invention are discussed below.

Suggesting Revised Query Terms

According to the embodiment of the invention described above with reference to FIG. 1, a new and different revised set of result documents is automatically generated based on revised query terms. When specified criteria are satisfied, references to result documents in the latest revised set of result documents are presented to the user who supplied the initial query terms. In such an embodiment of the invention, the initial set of search results might not ever be presented to the user. Additionally, the revised query terms might be never be revealed to the user.

However, according to an alternative embodiment of the invention, references to result documents in a revised set of result documents are not initially presented to the user. Instead, references to result documents in the initial set of result documents, generated based on the initial query terms, are initially presented to the user. The revised query terms and the revised sets of result documents are still generated as described above. Once the last iteration of the technique described above has completed, the latest set of revised query terms is presented to the user as "suggested revised query terms."

For example, the suggested revised query terms may be presented along with references to result documents in the initial set of result documents. That way, if the user is not satisfied with the references to result documents in the initial set of result documents, the user can instruct the search engine to perform another search, this time using the suggested revised query terms. In response to such instruction, the search engine may present references to result documents in the latest set of revised result documents, which were previously automatically generated in order to determine the suggested revised query terms. Alternatively, instead of performing another search, the search engine may simply re-score and re-rank each of the result documents in the initial set based on the suggested revised query terms; the result documents presented to the user may be the same result documents originally presented to the user, but presented in a different order.

For example, if the user initially supplies the query terms "worlds," "war," and "2," then the search engine may initially present references to result documents in an initial set that was generated based only on the initial query terms. However, using the techniques described above, the search engine may also generate revised query terms, such as "WW2," "Adolf Hitler," "Holocaust," "Allied Forces," and "Normandy." The additional query terms "WW2," "Adolf Hitler," "Holocaust," "Allied Forces," and "Normandy" may be gleaned from anchor text within the result documents in the initial set, for example. The search engine may present these revised query terms to the user as suggested revised query terms along with the references to the search results in the initial set of search results. Indeed, by the time of suggesting the revised query terms, the search engine may have already generated a set of revised result documents based on the revised query terms. Then, if the user desires, the user can instruct the search engine to present references to results documents in the revised set that was generated based on the revised query terms, "WW2," "Adolf Hitler," "Holocaust," "Allied Forces," and "Normandy."

Using Non-Anchor Text to Generate Revised Query Terms

According to the embodiment of the invention described above with reference to FIG. 1, revised query terms are taken from the anchor text of selected links that occur in a set of documents. However, in some embodiments of the invention, revised query terms are additionally or alternatively taken from other text that is associated with such selected links. Such text might be within the HTML tag of a selected link, but such text might not be text that is to be displayed in a document. For example, metadata within the HTML tag of a selected link might be used to generate a revised query term. For another example, "hover text" (also called "tool tip" text), which would normally appear only when a user moves his mouse pointer over an associated link for a sufficient length of time, might be used to generate a revised query term.

In some embodiments of the invention, the text used to generate a link might not even be indicated in the link's tag. For example, words that are within a certain distance of a link within a document that contains the link might be considered as possibilities for inclusion within revised query terms.

Revising Query Terms Based on Links to Non-Top "N" Documents

According to the embodiment of the invention described above with reference to FIG. 1, for each result document in the top "N" result documents, links that refer to other result documents in the top "N" result documents are selected. Thus, in such an embodiment of the invention, a link within a top "N" result documents can only be selected if the document to which that link refers is also a top "N" result document.

However, in some alternative embodiments of the invention, there is no such restriction on which links can be selected. For example, in one embodiment of the invention, a link within a top "N" result document can be selected as long as that link refers to another document within the current set of result documents, even if that document is not within the top "N."

Revising Query Terms Based on Links from Non-Top "N" Documents

According to the embodiment of the invention described above with reference to FIG. 1, for each result document in the top "N" result documents, links that refer to other result documents in the top "N" result documents are selected. However, in one embodiment of the invention, links that refer to result documents in the top "N" result documents may be selected even if those links are contained in documents that are not within the top "N" result documents. Indeed, in one embodiment of the invention, links that refer to result documents in the top "N" result documents may be selected even if those links are contained in documents that are not even within the current set of result documents.

As is discussed above, a separate list of incoming and outgoing links may be maintained, in an index, for every document that a search engine has previously discovered. Thus, for each particular document known to the search engine, the index may indicate (a) a list of all of the other known documents that contain links that refer to that particular document (i.e., incoming links) and (b) a list of all of the other known documents to which links in that particular document refer (i.e., outgoing links). In one embodiment of the invention, for each document within the top "N" result documents, all incoming links that are associated with that document are selected in addition to any outgoing links that are associated with that document. Thus, a link contained within a document that does not even occur within the current set of result documents may be selected if that link refers to a document that occurs within the top "N" result documents.

Weighting Selected Links

According to the embodiment of the invention described above with reference to FIG. 1, a separate weight is determined for each of the links in the group of selected links. The selected links are then ranked based on their weights, and text associated with the top "X" selected links is used to generate revised query terms.

In one embodiment of the invention, for each selected link, a determination is made as to whether the anchor text in that selected link corresponds to the subject of the sentence in which that link occurs. If the anchor text does correspond to the subject of the sentence in which the link occurs, then the link is given a heavier weight than would have been given had the anchor text corresponded to a part of the sentence that was not the subject thereof.

In one embodiment of the invention, for each selected link, a determination is made as to whether the anchor text in that selected link occurs within a title or header of a result document. The determination may be made by examining the HTML tags that encompass the link's tag, for example. If the anchor text does occur within a title or header of the result document in which the link occurs, then the link is given a heavier weight than would have been given had the anchor text not occurred within a title or header.

In one embodiment of the invention, for each selected link, a determination is made as to whether the anchor text within that link is in bold, italicized, or otherwise emphasized or strong font. If the anchor text is in a bold, italicized, or otherwise emphasized or strong font, then the link is given a heavier weight than would have been given had the anchor text not been in such a font.

In one embodiment of the invention, a determination is made as to how many times the words or phrases within each selected link occur in the set of selected links. If the words or phrases within a particular selected link occur a greater number of times than other words or phrases within the selected links, then the particular link is given a heavier weight than otherwise would have been given.

Converging upon a Final Set of Revised Query Terms

As is discussed above with reference to FIG. 1, the technique described above may be repeated through several iterations before arriving at a final set of revised query terms. In each iteration, the revised query terms may change or expand. After each iteration, a determination is made as to whether specified criteria have been satisfied. In one embodiment of the invention, if the criteria have been satisfied, then no further iterations are performed, and the final revised query terms are either suggested to a user or used to generate final search results that are then presented to the user.

In one embodiment of the invention, the criteria are based on how many of the same documents are referenced in both the search results from the most current iteration and the search results from the iteration immediately before that one. For example, a determination may be made as to what proportion of documents referenced in the previous set of search results also are referenced in the current set of search results. If that proportion is at least as great as a specified proportion of the total number of documents referenced in the current set of search results, then it is determined that no further iterations need to be performed. In other words, the final revised query terms are converged upon when the documents referenced by the current search results are sufficiently similar to the documents referenced by the immediately previous search results. Such a similarity demonstrates that a convergence has occurred.

In an alternative embodiment of the invention, the criteria are based simply on a number of iterations that have been performed. For example, it may be determined that after three iterations of the technique described above, the revised query terms produced by the last iteration will be used to generate search results that will be presented to the user.

Hardware Overview

Figure 2:
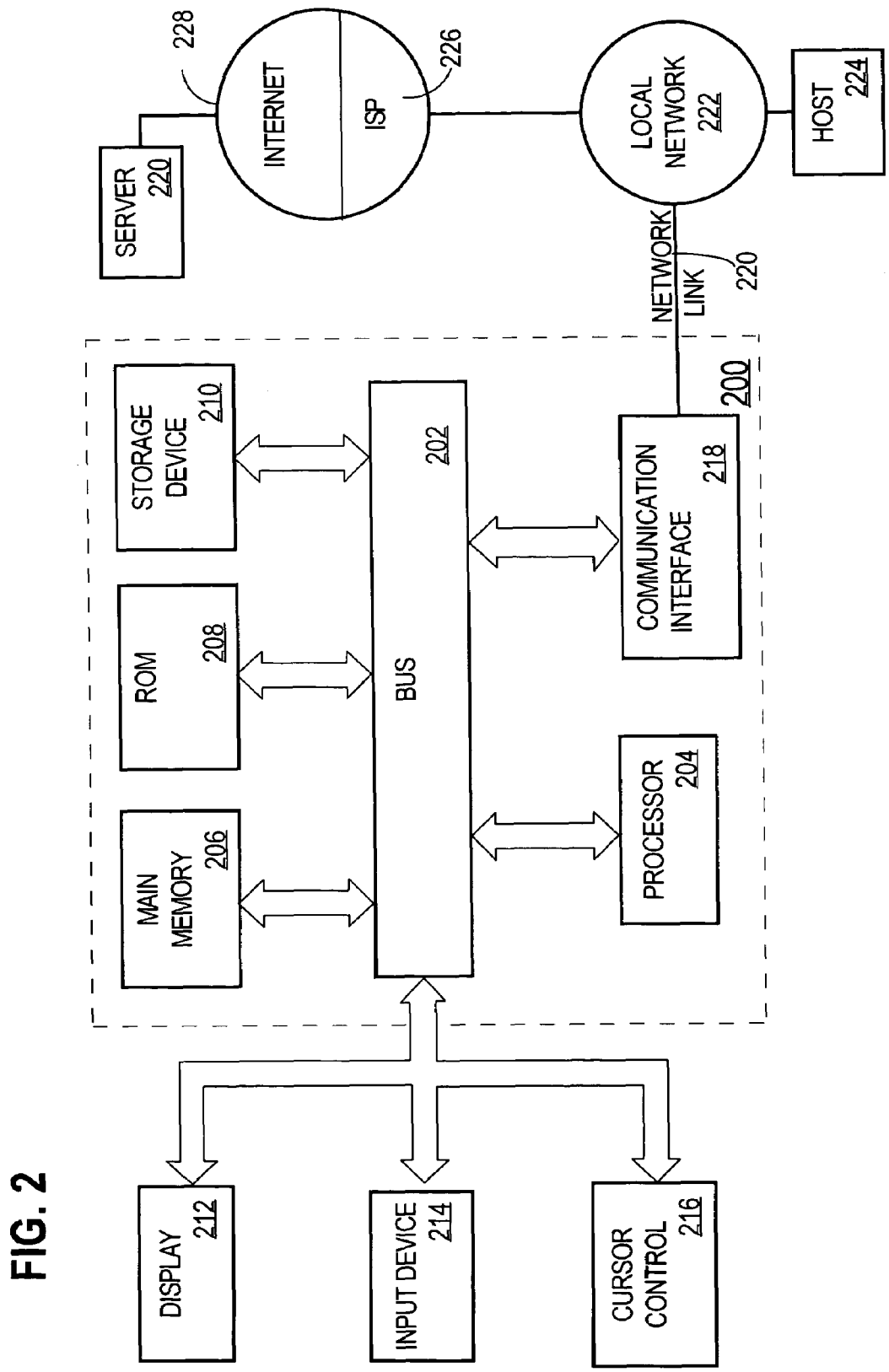
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
receiving first query terms from a user;
automatically selecting, based at least in part on the first query terms, and from among a set of documents, first documents;
automatically generating second query terms based at least in part on anchor text that is contained within links that occur within the first documents;
automatically selecting, based at least in part on the second query terms, and from among the set of documents, second documents;
wherein the first documents differ from the second documents;
automatically generating third query terms based at least in part on anchor text that is contained within links that occur within the second documents, and not based on any input from said user;
and automatically selecting, based at least in part on the third query terms, and from among the set of documents, third documents;
wherein the third documents differ from the first documents and the second documents;
determining a first number that is a number of documents in an intersection of (a) a set consisting of the first documents and (b) a set consisting of the second documents;
determining a second number that is the first number divided by a number of documents in the set consisting of the second documents;
determining whether the second number is at least as great as a specified percentage;
and in response to determining that the second number is not at least as great as the specified percentage, automatically generating the third query terms based at least in part on anchor text that is contained within links that occur within the second documents;
wherein the step of generating the third query terms is performed by one or more computing devices;
and wherein said first and second documents are not displayed to said user.

2. The method of claim 1, further comprising:
sending at least some documents in the third set of documents toward the user in response to the user's submission of the first query terms.

3. The method of claim 1, further comprising:
sending at least some search results in the first set of search results toward the user along with the third query terms in response to the user's submission of the first query terms.

4. The method of claim 1, wherein automatically generating the second query terms comprises automatically generating the second query terms based at least in part on hover text.

5. The method of claim 1, wherein automatically generating the second query terms comprises automatically generating the second query terms based only on anchor text that is contained within links that occur within documents that are in a top "N" subset of the first documents.

6. The method of claim 1, wherein automatically generating the second query terms comprises automatically generating the second query terms based at least in part on anchor text that is (a) contained within links that refer to documents that are in a top "N" subset of the first documents but (b) not contained in any document in the top "N" subset of the first documents.

7. The method of claim 1, further comprising:
associating, with each particular link in the links that occur within the first documents, a weight that is based on whether text of that particular link occurs within a grammatical subject of a sentence in which that particular link occurs.

8. The method of claim 1, further comprising:
associating, with each particular link in the links that occur within the first documents, a weight that is based on whether text of that particular link occurs within at least one of:
a) a title of a document in which that particular link occurs;
and b) a header within a document in which that particular link occurs.

9. The method of claim 1, further comprising:
associating, with each particular link in the links that occur within the first documents, a weight that is based on whether text of that particular link is in at least one of:
a) a bold font;
b) an italicized font;
and c) an emphasized font.

10. The method of claim 1, further comprising:
associating, with each particular link in the links that occur within the first documents, a weight that is based on a number of times that text of that particular link occurs within the links that occur within the first documents.

11. A volatile or non-volatile computer-readable storage medium storing instructions which, when executed by one or more processors, cause the one or more processors to perform steps comprising:
receiving first query terms from a user;
automatically selecting, based at least in part on the first query terms, and from among a set of documents, first documents;
automatically generating second query terms based at least in part on anchor text that is contained within links that occur within the first documents;
automatically selecting, based at least in part on the second query terms, and from among the set of documents, second documents;
wherein the first documents differ from the second documents;
automatically generating third query terms based at least in part on anchor text that is contained within links that occur within the second documents, and not based on any input from said user;
and automatically selecting, based at least in part on the third query terms, and from among the set of documents, third documents;
wherein the third documents differ from the first documents and the second documents;
determining a first number that is a number of documents in an intersection of (a) a set consisting of the first documents and (b) a set consisting of the second documents;
determining a second number that is the first number divided by a number of documents in the set consisting of the second documents;
determining whether the second number is at least as great as a specified percentage;
and in response to determining that the second number is not at least as great as the specified percentage, automatically generating the third query terms based at least in part on anchor text that is contained within links that occur within the second documents;
wherein said first and second documents are not displayed to said user.

12. The volatile or non-volatile computer-readable storage medium of claim 11, wherein the steps further comprise:
sending at least some documents in the third set of documents toward the user in response to the user's submission of the first query terms.

13. The volatile or non-volatile computer-readable storage medium of claim 11, wherein the steps further comprise:
sending at least some search results in the first set of search results toward the user along with the third query terms in response to the user's submission of the first query terms.

14. The volatile or non-volatile computer-readable storage medium of claim 11, wherein automatically generating the second query terms comprises automatically generating the second query terms based at least in part on hover text.

15. The volatile or non-volatile computer-readable storage medium of claim 11, wherein automatically generating the second query terms comprises automatically generating the second query terms based only on anchor text that is contained within links that occur within documents that are in a top "N" subset of the first documents.

16. The volatile or non-volatile computer-readable storage medium of claim 11, wherein automatically generating the second query terms comprises automatically generating the second query terms based at least in part on anchor text that is (a) contained within links that refer to documents that are in a top "N" subset of the first documents but (b) not contained in any document in the top "N" subset of the first documents.

17. The volatile or non-volatile computer-readable storage medium of claim 11, wherein the steps further comprise:
associating, with each particular link in the links that occur within the first documents, a weight that is based on whether text of that particular link occurs within a grammatical subject of a sentence in which that particular link occurs.

18. The volatile or non-volatile computer-readable storage medium of claim 11, wherein the steps further comprise:
associating, with each particular link in the links that occur within the first documents, a weight that is based on whether text of that particular link occurs within at least one of:
a) a title of a document in which that particular link occurs;
and b) a header within a document in which that particular link occurs.

19. The volatile or non-volatile computer-readable storage medium of claim 11, wherein the steps further comprise:
associating, with each particular link in the links that occur within the first documents, a weight that is based on whether text of that particular link is in at least one of:
a) a bold font;
b) an italicized font;
and c) an emphasized font.

20. The volatile or non-volatile computer-readable storage medium of claim 11, wherein the steps further comprise: associating, with each particular link in the links that occur within the first documents, a weight that is based on a number of times that text of that particular link occurs within the links that occur within the first documents.

* * * * *